(12) United States Patent
Lee et al.

(10) Patent No.: US 7,254,675 B2
(45) Date of Patent: Aug. 7, 2007

(54) MEMORY SYSTEM HAVING MEMORY MODULES WITH DIFFERENT MEMORY DEVICE LOADS

(75) Inventors: Jae-Jun Lee, Seoul (KR); Byung-Se So, Sungnam (KR); Myun-Joo Park, Incheon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 383 days.

(21) Appl. No.: 10/629,866

(22) Filed: Jul. 30, 2003

(65) Prior Publication Data
US 2004/0024966 A1 Feb. 5, 2004

(30) Foreign Application Priority Data
Aug. 2, 2002 (KR) .................. 10-2002-0045914

(51) Int. Cl.
*G06F 12/00* (2006.01)
(52) U.S. Cl. ................. 711/115; 711/100; 711/101; 710/5; 710/6; 710/58; 710/305; 439/631
(58) Field of Classification Search ........... 439/631; 710/305, 5, 6, 58; 711/100, 101, 115
See application file for complete search history.

(56) References Cited

U.S. PATENT DOCUMENTS

| | | | | |
|---|---|---|---|---|
| 5,998,865 A * | 12/1999 | Akram | .................. | 257/723 |
| 6,081,862 A * | 6/2000 | Dixon et al. | .................. | 710/307 |
| 6,144,576 A * | 11/2000 | Leddige et al. | .................. | 365/63 |
| 6,725,314 B1 * | 4/2004 | Dong | .................. | 710/305 |
| 2002/0041020 A1 * | 4/2002 | Ono et al. | .................. | 257/685 |
| 2002/0142660 A1 * | 10/2002 | Abe | .................. | 439/631 |
| 2003/0043613 A1 * | 3/2003 | Doblar et al. | .................. | 365/63 |
| 2003/0049949 A1 * | 3/2003 | Abe | .................. | 439/61 |
| 2005/0262323 A1 * | 11/2005 | Woo et al. | .................. | 711/167 |

* cited by examiner

*Primary Examiner*—Stephen C. Elmore
*Assistant Examiner*—Daniel Kim
(74) *Attorney, Agent, or Firm*—Volentine & Whitt, PLLC

(57) ABSTRACT

A memory system system includes a single in-line memory module (SIMM) which contains a memory device and a signal transmission line connected between the memory device and a connection terminal, and a dual in-line memory module (DIMM) which contains two memory devices and a signal transmission line connected between the two memory devices and a connection terminal. A length of the signal transmission line of the SIMM is longer than a length of the signal transmission line of the DIMM. The load of the memory device of the SIMM is less than the load of memory devices of the DIMM, and the longer length of the signal transmission line of the SIMM increases a signal delay time of the SIMM to compensate for the different loads of the SIMM and DIMM memory devices. The longer length of the signal transmission line of the SIMM may further compensate for a signal transmission line connected between the first and second sockets which receive the SIMM and DIMM, respectively.

9 Claims, 3 Drawing Sheets

MEMORY SYSTEM HAVING MEMORY MODULES WITH DIFFERENT MEMORY DEVICE LOADS

BACKGROUND OF THE INVENTION

1. Field of the Invention

The present invention relates to a memory system, and more particularly, the present invention relates to improving the signal integrity of a memory bus channel of a memory system having different types of memory modules, for example, a dual in-line memory module (DIMM) and a single in-line memory module (SIMM).

A claim of priority is made to Korean Patent Application No. 2002-45914, filed Aug. 2, 2002 and entitled "Memory System", which is incorporated by reference herein in its entirety.

2. Description of the Related Art

A computer memory system is generally made up of a memory controller chip set, memory devices, resistive elements, and wires mounted on a computer main board. The wires electrically interconnect the memory controller chip set, the memory devices and the resistive elements, and a memory bus channel functions as a data or signal transmission line between the memory controller chip set and the memory devices. The memory devices are mounted on the main board in a modular fashion.

When mounted on the main board, the memory module acts as a load on the memory bus channel, thereby electrically deteriorating channel characteristics. For example, the bandwidth of the memory bus channel is narrowed due to the parasitic components of each device on the main board and resultant impedance mismatches. Further, signal integrity is deteriorated which results in signal distortion and signal modification, particularly when the memory system is operated at high speed.

It has been suggested to use a plurality of memory bus channel structures in an attempt to prevent deterioration of signal integrity in high speed memory systems. Among these channel structures, a stub type channel is widely used for a memory data query (DQ) channel. In the stub type channel structure, a series resistor or a parallel capacitor is provided between the memory controller chip set and a first memory module, and a channel stop resistor is provided at an end of the memory channel. The stub type channel structure reduces wave reflection resulting from impedance mismatches, thereby substantially decreasing channel noise and improving signal integrity.

The stub type channel structure, however, may not sufficiently improve signal integrity adapted in a memory system having both a dual in-line memory module (DIMM) and a single in-line memory module (SIMM). In such a memory system, the channel structure and a channel length are the same for both the DIMM and SIMM. However, since the DIMM and SIMM have differing loads, the delay times of the modules are not the same and therefore signals arrive at the modules at different timings.

That is, when compared to a memory system having one type of memory module, signal integrity of the stub type channel structure is degraded when adapted in a memory system having different types of memory modules, for example, both SIMMs and DIMMs. This is especially problematic in the case of memory systems operating at high speeds, where signal integrity is particularly important.

SUMMARY OF THE INVENTION

The present invention is at least partially characterized by increasing the length of a transmission line of a first memory module relative to the length of a transmission line of a second memory module, where the memory device load of the first memory module is less than the memory device load of the second memory module. In this manner, signal integrity is improved.

According to one aspect of the present invention, a memory system includes a SIMM which contains at least one memory device and a signal transmission line connected between the at least one memory device and a connection terminal, and a DIMM which contains at least two memory devices and a signal transmission line connected between the at least two memory devices and a connection terminal, where a length of the signal transmission line of the SIMM is longer than a length of the signal transmission line of the DIMM. The load of the memory devices of the SIMM is less than the load of memory devices of the DIMM, and the longer length of the signal transmission line of the SIMM increases a signal delay time of the SIMM to compensate for the different loads of the SIMM and DIMM memory devices. The memory system may further include a first socket which receives the connection terminal of the SIMM, a second socket which receives the connection terminal of the DIMM, and a signal transmission line connected between the first and second sockets, and the longer length of the signal transmission line of the SIMM may further compensate for the signal transmission line connected between the first and second sockets.

According to another aspect of the present invention, a memory system includes a memory controller, a first memory module including at least one first memory device having a first load and a first signal transmission line connected between the at least one first memory device and a connection terminal, a second memory module including at least one second memory device having a second load and a second signal transmission line connected between the at least one second memory device and a connection terminal, and first and second sockets which are connected to the memory controller and which respectively receive the connection terminals of the first and second memory modules. The first load of the at least one first memory device is less than the second load of the at least one second memory device, and a length of the first signal transmission line of the first memory module is longer than a length of the second signal transmission line of the second memory module. The longer length of the first signal transmission line of the first memory module increases a signal delay time of the first memory module to compensate for the different loads of the first and second memory modules. Also, the longer length of the first signal transmission line of the first memory module may further compensate for the presence of another transmission line connected between the first and second sockets.

BRIEF DESCRIPTION OF THE DRAWINGS

These and other features and advantages of the present invention will be readily apparent to those of ordinary skill in the art upon review of the detailed description that follows when taken in conjunction with the accompanying drawings, in which like reference numerals denote like parts, and in which.

DETAILED DESCRIPTION OF THE PREFERRED EMBODIMENTS

Figure 1:
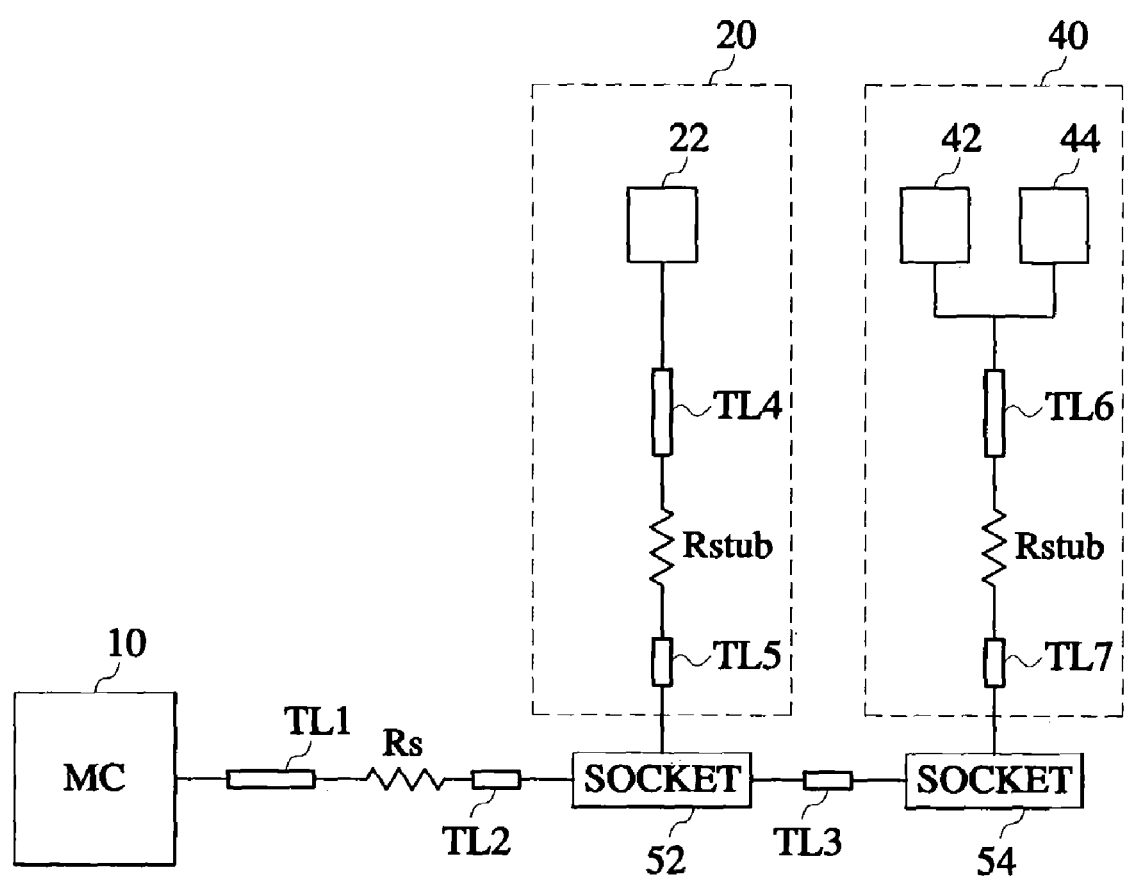
FIG. 1 illustrates a block diagram of a memory system having a dual in-line memory module (DIMM) and a single in-line memory module (SIMM) in accordance with the present invention.

FIG. 1 illustrates a block diagram of a memory system in accordance with the present invention. As shown in FIG. 1, the memory system includes one single in-line memory module (SIMM) 20 and one dual in-line memory module (DIMM) 40. In fact, a memory system may include more than one SIMM and DIMM. There may be other semiconductor devices in the memory system, but only devices connected to a DQ channel are illustrated in FIG. 1.

In addition to the SIMM 20 and the DIMM 40, the memory system of FIG. 1 includes a memory controller (MC) 10, a first socket 52 for receiving the SIMM 20, a second socket 54 for receiving the DIMM 40, signal transmission lines TL1 and TL2 for transmitting data between the memory controller 10 and the first socket 52, an impedance matching resistive element Rs connected between the memory controller 10 and the first socket 52, and a signal transmission line TL3 for transmitting data between the first socket 52 and the second socket 54.

SIMM 20 contains a memory device 22, signal transmission lines TL4 and TL5 for transmitting data between the memory device 22 and the first socket 52, and an impedance matching stub, resistive element Rstub connected between the memory device 22 and the first socket 52.

DIMM 40 contains memory devices 42 and 44, signal transmission lines TL6 and TL7 for transmitting data between the memory devices 42, 44 and the second socket 54, and an impedance matching stub resistive element Rstub connected between the memory devices 42, 44 and the second socket 54.

As is apparent in FIG. 1, the number of memory devices acting as the loads is different in the SIMM 20 and DIMM 40. Namely, the SIMM 20 has a single memory device 22 acting as a load, and the DIMM 40 has two memory devices 42 and 44 acting as loads. Accordingly, the signal delay time of the SIMM 20 is different than that of DIMM 40.

More specifically, when operated in the memory system, the SIMM 20 exhibits a shorter signal delay time in comparison with the DIMM 40 because the number of the memory devices (i.e., the load) in the SIMM 20 is smaller than that in DIMM 40. Also, the transmission line TL3 connecting the socket 52 to the socket 54 increases the overall transmission line length associated with the DIMM 40. Thus, the transmission line TL3 is another contributing factor to the short signal delay time of the SIMM 20 relative to that of the DIMM 40.

According to an embodiment of the present invention, however, the signal delay time of the SIMM type memory module 20 is altered by increasing the combined length of the signal transmission lines TL4 and TL5 in the SIMM 20 so as to be greater than the combined length of the signal transmission lines TL6 and TL7 of the DIMM 40. In this manner, by configuring the memory system such that SIMM 20 and DIMM 40 have signal transmission lines of different lengths, the signal delay time difference otherwise caused by the differing loads and the transmission line TL3 can be reduced and the signal integrity can be improved.

Figure 2A:
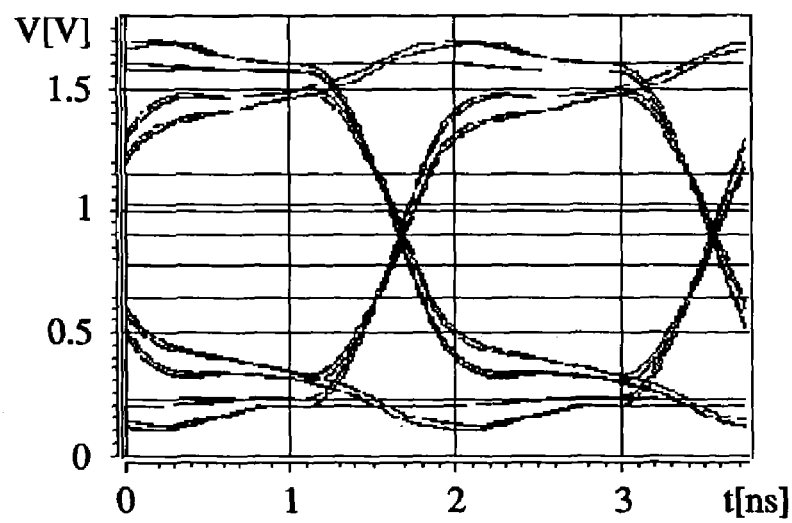
FIG. 2A and FIG. 2B illustrate simulated waveforms of the signal integrity of the memory system in FIG. 1, except that the simulation is performed assuming that the length of respective signal transmission lines of the DIMM and SIMM are the same.
Figure 2B:
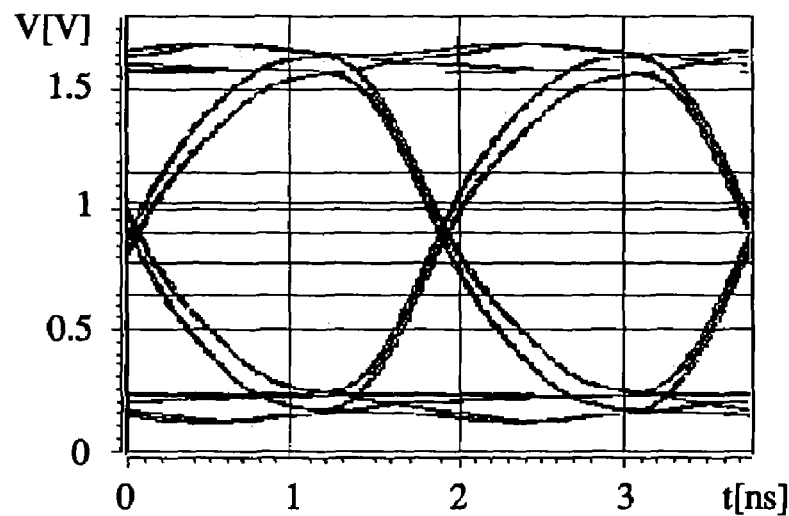
Figure 3A:
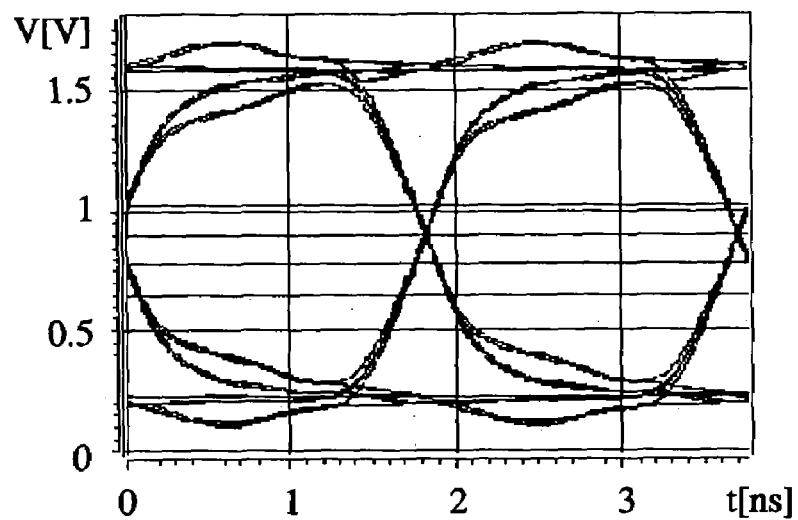
FIG. 3A and FIG. 3B illustrate simulated waveforms of the signal integrity of the memory system shown in FIG. 1, where the simulation is performed assuming that the length of respective signal transmission lines of the DIMM and SIMM are different.
Figure 3B:
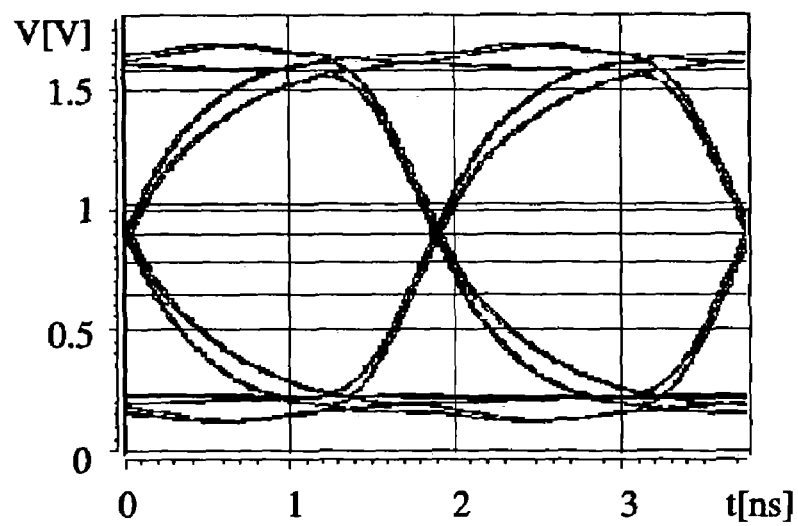

FIG. 2A and FIG. 2B illustrate waveforms showing the simulated signal integrity of the memory system in which the signal transmission lines of the SIMM 20 and DIMM 40 have the same length, and FIG. 3A and FIG. 3B illustrate waveforms showing the simulated signal integrity of the memory system in which the signal transmission line of the SIMM 20 is longer than that of DIMM 40.

The signal integrity is measured from a pad formed on the memory device when the memory system is operated at 533 Mbps write speed. In the simulation, input capacitance of the memory devices 22, 42, 44 are set to 4 pF, a power supply voltage is set to 1.8V, and distance between the first socket 52 and the second socket 54 is set to 0.45 inches.

FIG. 2A illustrates the signal integrity of the SIMM 20 and FIG. 2B illustrates the signal integrity of the DIMM 40. The signal transmission line TL6 of the DIMM 40 and the signal transmission line TL4 of the SIMM 20 have the same length of 0.8 inches. The length of the signal transmission line TL5 is the same as that of the signal transmission line TL7, and the stub resistance Rstub of the SIMM 20 is the same as that of the DIMM 40. As shown in FIG. 2A and FIG. 2B, a substantial degree of skew is observed, which means that the signal integrity is not good. At a voltage of 0.9V, the degree of the skew is 44 ps in the SIMM 20 and 72 ps in the DIMM 40. This deterioration in signal integrity is due at least in part to the different loads of the memory devices.

FIG. 3A illustrates the system integrity of the SIMM 20 and FIG. 3B illustrates the system integrity of the DIMM 40. The length of the signal transmission line TL6 of the DIMM 40 is 0.8 inches, and the length of the signal transmission line TL4 is 1.8 inches. The length of the signal transmission line TL5 is the same as that of the signal transmission line TL7, and the stub resistance Rstub of the SIMM 20 is the same as that of the DIMM 40.

As is apparent in FIGS. 3A and 3B, the degree of skew is substantially reduced by forming the signal transmission line TL4 in the SIMM 20 to be longer than the signal transmission line TL6 in DIMM 40. At the voltage of 0.9V, the degrees of skews are 18 ps in the SIMM 20 and 50 ps in the DIMM 40. In comparison with the simulation results of FIG. 2A and FIG. 2B, the simulation results of FIG. 3A and FIG. 3B show a reduction of skew to the extent of 26 ps and 22 ps in the SIMM 20 and the DIMM 40, respectively.

According to the present invention, the longer length of the signal transmission line of the SIMM 20 increases a signal delay time of the SIMM 20 to compensate for the different loads of the SIMM 20 and DIMM 40. In addition, the longer length of the signal transmission line of the SIMM 20 can further compensate for the signal transmission line TL3 connected between the first and second sockets 52, 54.

In the embodiment described above, the memory system includes one DIMM 40 and one SIMM 20. However, the invention may be applied to a memory system having more than one DIMM 40 and/or more than one SIMM 20. Likewise, the invention may be applied to other types of memory modules having differing loads.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A memory system comprising:
   at least one single in-line memory module (SIMM) including at least one memory device and a signal transmission line connected between the memory device and a connection terminal;
   at least one dual in-line memory module (DIMM) including at least two memory devices and a signal transmission line connected between the two memory devices and a connection terminal,
   a first socket which receives the connection terminal of the at least one SIMM;
   a second socket which receives the connection terminal of the at least one DIMM; and
   a signal transmission line connected between the first and second sockets,
   wherein a length of the signal transmission line of the at least one SIMM is longer than a length of the signal transmission line of the at least one DIMM, and wherein the longer length of the signal transmission line of the at least one SIMM increases the signal delay time of the at least one SIMM to further compensate for the signal delay time difference caused by the signal transmission line connected between the first and second sockets.

2. The memory system according to claim 1, wherein a load of the at least one memory device of the at least one SIMM is less than a load of the memory devices of the at least one DIMM, and wherein the longer length of the signal transmission line of the at least one SIMM increases a signal delay time of the at least one SIMM to further compensate for the different loads of the at least one memory device of the at least one SIMM and the memory devices of the at least one DIMM.

3. A memory system comprising:
   a memory controller;
   a first memory module including at least one first memory device having a first load and a first signal transmission line connected between the at least one first memory device and a connection terminal;
   a second memory module including at least one second memory device having a second load and a second signal transmission line connected between the at least one second memory device and a connection terminal, wherein the second load is greater than the first load; and
   first and second sockets which are connected to the memory controller and which respectively receive the connection terminals of the first and second memory modules,
   wherein a length of the first signal transmission line of the first memory module is longer than a length of the second signal transmission line of the second memory module, and wherein the longer length of the first signal transmission line of the first memory module increases a signal delay time of the first memory module to compensate for the different loads of the first and second modules.

4. The memory system according to claim 3, further comprising a third signal transmission line connected between the memory controller and the first socket, and a fourth signal transmission line connected between the first socket and the second socket, wherein the longer length of the first signal transmission line of the first memory module further compensates for the signal delay time difference caused by the fourth signal transmission line connected between the first and second sockets.

5. The memory system according to claim 4, wherein each of the first, second and third signal transmission lines includes an impedance matching resistive element.

6. The memory system according to claim 3, wherein the first memory module is a single in-line memory module, and the second memory module is a dual in-line memory module.

7. The memory system according to claim 3, wherein the first memory module is a single in-line memory module, and the second memory module is a dual in-line memory module.

8. The memory system according to claim 4, wherein the first memory module is a single in-line memory module, and the second memory module is a dual in-line memory module.

9. The memory system according to claim 5, wherein the first memory module is a single in-line memory module, and the second memory module is a dual in-line memory module.

* * * * *